US008864163B1

(12) United States Patent  (10) Patent No.: US 8,864,163 B1
Buvala  (45) Date of Patent: Oct. 21, 2014

(54) CART ASSEMBLY FOR FENCE NETTING

(71) Applicant: Matthew J. Buvala, Pepin, WI (US)

(72) Inventor: Matthew J. Buvala, Pepin, WI (US)

( * ) Notice: Subject to any disclaimer, the term of this patent is extended or adjusted under 35 U.S.C. 154(b) by 0 days.

(21) Appl. No.: 13/684,396

(22) Filed: Nov. 23, 2012

Related U.S. Application Data

(60) Provisional application No. 61/630,169, filed on Dec. 6, 2011.

(51) Int. Cl.
*B62B 3/10* (2006.01)
*B62D 61/12* (2006.01)

(52) U.S. Cl.
CPC .. *B62B 3/10* (2013.01); *B62D 61/12* (2013.01)
USPC .................................................. 280/476.1

(58) Field of Classification Search
CPC ............. A01K 3/005; B60D 1/66; E04H 7/26
USPC ......... 256/10, 1, 32, 33, 45; 280/62, 63, 79.3, 280/79.11, 160, 476.1
See application file for complete search history.

(56) References Cited

U.S. PATENT DOCUMENTS

| 2,335,297 | A | * | 11/1943 | Millhouse et al. | 280/476.1 |
| 2,645,503 | A | * | 7/1953 | Johnson | 280/160 |
| 2,723,130 | A | * | 11/1955 | Andrews | 280/47.19 |
| 4,984,814 | A | * | 1/1991 | Graffunder | 280/35 |
| 5,421,597 | A | * | 6/1995 | Berner | 280/204 |

* cited by examiner

*Primary Examiner* — Joseph M Rocca
*Assistant Examiner* — Felicia L Brittman
(74) *Attorney, Agent, or Firm* — Skinner and Associates; Joel Skinner

(57) ABSTRACT

A fence netting cart assembly, suitable for both deploying and picking up a length of fence netting, including fence netting with integral posts fastened to the fence netting at regular intervals. The fence netting cart assembly includes a frame member with a pair of wheel members each on opposite sides thereof, with each wheel member rotatably attached to the frame member. The frame member includes a support section between the wheel members and a tongue section extending from the frame member. A pair of spaced apart rod members are secured to the support section. The support section with spaced apart rod members is adapted for removably supporting folded fence netting.

9 Claims, 5 Drawing Sheets ions, IF ANY

CART ASSEMBLY FOR FENCE NETTING

CROSS-REFERENCE TO RELATED APPLICATIONS, IF ANY

This application claims the benefit under 35 U.S.C. §119 (e) of provisional application Ser. No. 61/630,169, filed 6 Dec. 2011. Application Ser. No. 61/630,169 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a cart assembly and, more particularly, to a wheeled cart assembly for fence netting and, most particularly, to a wheeled cart assembly for deploying, retrieving and storing fence netting.

2. Background Information

Fence netting is widely used for control of animal access to various areas of land. A particularly useful design of fence netting incorporates fencing posts secured to the fence netting at regular intervals. Such fence netting is available commercially in various heights up to 5 feet and lengths as long as 165 feet. The manufacturer strongly recommends that such fence netting be folded up by the posts, and not rolled up like a carpet. This is particularly important for the fence netting that is to be electrified for animal control. The folding and unfolding of the fence netting can be difficult, particularly if the process is performed by a single individual. To overcome this difficulty, applicant has invented a fence netting cart assembly that allows a single individual to deploy and erect a length of fence netting with integral posts, as well as pick up and move such a length of fence netting with integral posts. In addition, the fence netting cart assembly of the present invention includes structural features that allow a length of folded fence netting supported on the cart assembly to be stored in a state ready to be deployed at a future time.

Thus, the present invention represents an improvement over the current technology used for deploying and picking up fence netting.

SUMMARY OF THE INVENTION

The invention is directed to a fence netting cart assembly, suitable for both deploying and picking up a length of fence netting, including fence netting with integral posts fastened to the fence netting at regular intervals. The fence netting cart assembly includes a planar, rectangular frame member supported on a pair of wheel members, each wheel member on opposite sides thereof, with each wheel member rotatably attached to the frame member. The frame member includes a support section positioned between the wheel members and with a tongue section extending laterally from the frame member. A pair of spaced apart rod members are secured to the support section. The support section with spaced apart rod members is adapted for removably supporting folded fence netting.

In a preferred embodiment of the invention, the cart assembly for fence netting includes a planar, rectangular frame member supported on a pair of wheel members, each wheel member rotatably attached to opposite sides of the frame member. The planar, frame member includes a support section positioned there upon between the wheel members, the support section having a triangular cross section with an upper apex opposite the frame member. A tongue section extends laterally from the planar frame member. The tongue section includes a support wheel and an attachment hitch at an end of the tongue section opposite the planar, frame member. A pull handle member is secured to the tongue section opposite the frame member. A pair of spaced apart rod members are movably attached to the upper apex of the support section opposite the frame member. The support section with spaced apart rod members is adapted for removably supporting folded fence netting.

DESCRIPTION OF THE EMBODIMENTS

Figure 1:
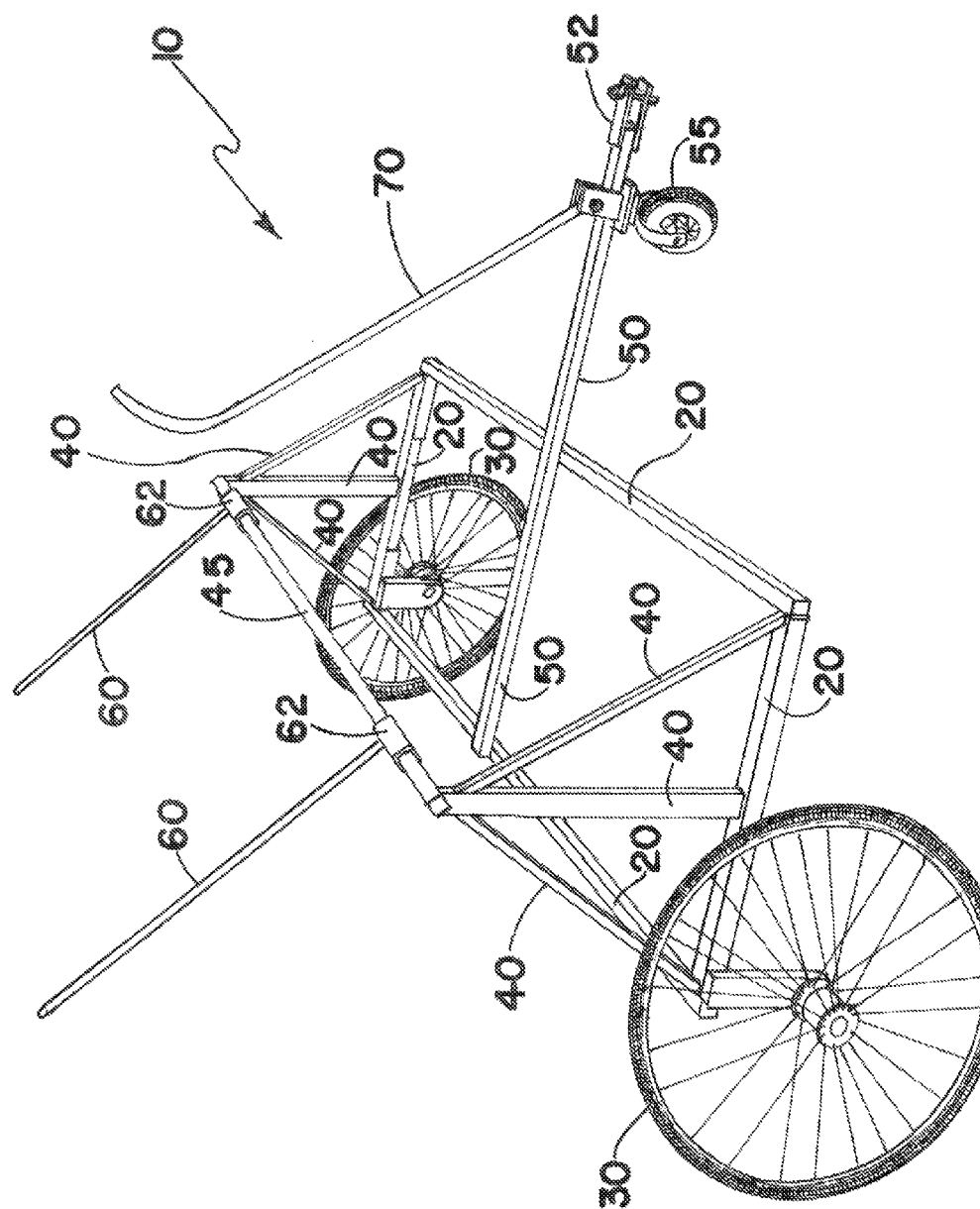
FIG. 1 is a perspective view of the fence netting cart assembly of the present invention.
Figure 2:
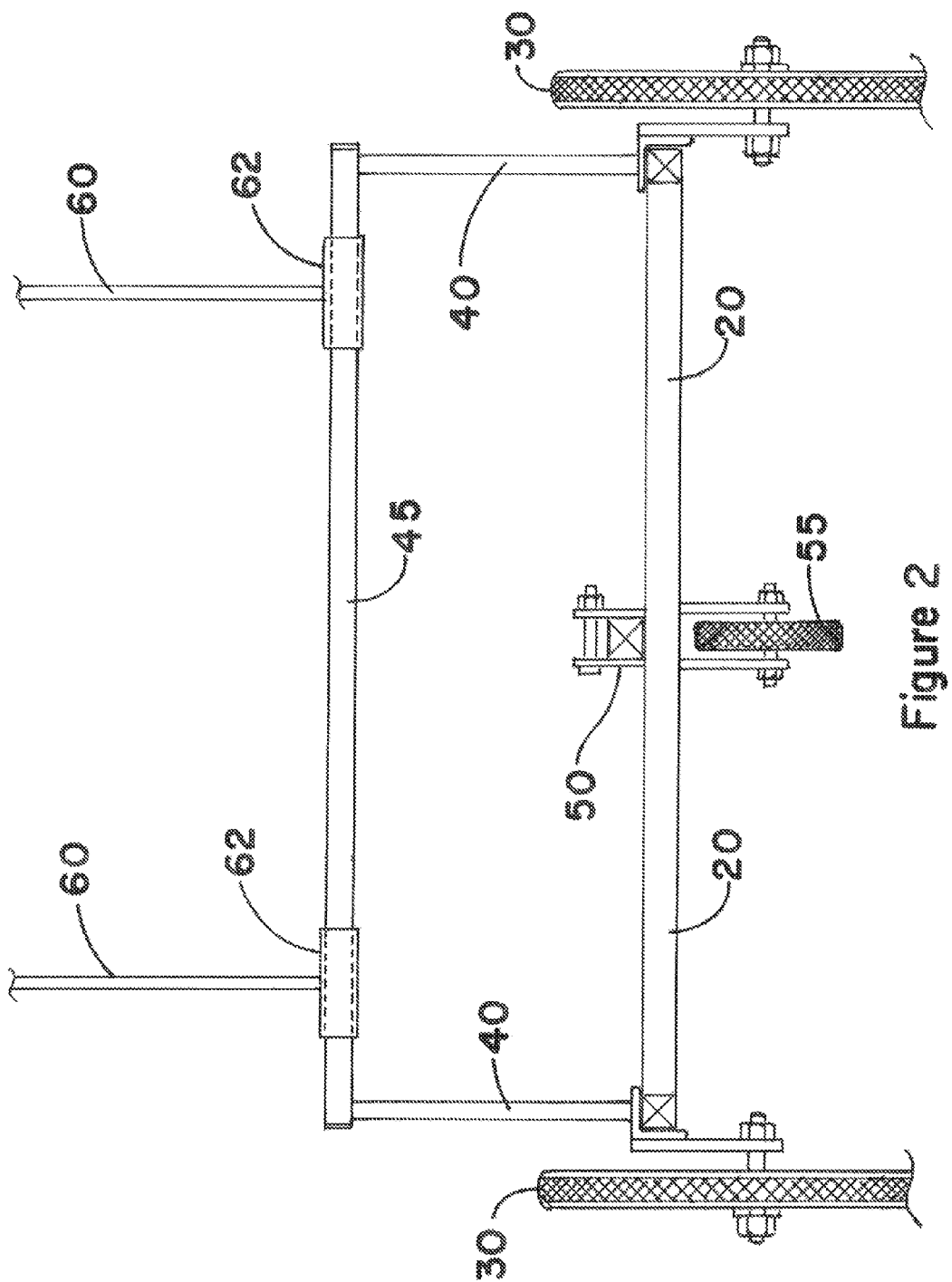
FIG. 2 is a rear view of the fence netting cart assembly of FIG. 1 of the present invention.

Nomenclature
  10 Cart Assembly
  20 Frame Member
  30 Wheel Members
  40 Support Section of Frame Member
  45 Upper Crossbar of Support Section
  47 Mounting Brackets for Storage Rack Assembly
  50 Tongue Section of Frame Member
  52 Hitch Member of Tongue Section
  55 Support Wheel of Tongue Section
  60 Support Rod Members
  62 Rod Connector Member
  64 Mounting Brackets for Storage Rack Assembly
  70 Pull Handle Member
  80 Removable Storage Rack Assembly
  82 Crossbar Member of Rack Assembly
  84 Anchoring Pegs of Rack Assembly
  86 U-Shaped Rod Members
  87 Handles of Storage Rack Assembly
  88 Rod Mounting Members
  89 Positioning Screws of Mounting Members
  90 Apron Member
  95 Grommet Members
F Fence Netting
  P Posts of Fence Netting
Construction The invention is a fence netting cart assembly, suitable for both deploying and picking up a length of fence netting, including fence netting with integral posts fastened to the fence netting at regular intervals. The fence netting cart assembly includes a frame member with a pair of wheel members, each wheel on an opposite side thereof, with each wheel member rotatably attached to the frame member. The frame member includes a support section between the wheel members and a tongue section extending from the frame member. A pair of spaced apart rod members are secured to the support section. The support section with spaced apart rod members is adapted for removably supporting folded fence netting.

Referring now to FIGS. 1-5, various views of the fence netting cart assembly 10 are shown. The fence netting cart assembly 10 includes a frame member 20. The frame member 20 preferably is planar, rectangular in shape, and fabricated mainly from square tubing. Each of a pair of wheel members 30 is rotatably fastened on opposite sides of the rectangular frame member 20. The wheel members 30 preferably are bicycle-type wheels with spokes. The frame member 20 includes a support section 40 positioned between the wheel members 30 and a tongue section 50, extending from the frame member 20 between the wheel members 30. Preferably the support section 40 of the frame member 20 has a triangular cross section with an upper apex opposite the wheel members 30.

In a further embodiment, the tongue section 50 includes a wheel member 55 at an end of the tongue section 50 opposite the frame member 20. In addition, a hitch member 52 is secured at the end of the tongue section 50 for attaching the cart assembly 10 to a motorized vehicle. Additionally, a pull handle member 70 is secured to the tongue section 50 adjacent the wheel member 55 to allow for easy movement of the cart assembly 10 by an individual.

A pair of spaced apart rod members 60 are secured to the upper apex of the support section 40 and extend opposite the tongue section 50 and above horizontal. Preferably, the space between the rod members 60 on the support section 40 is adjustable to accommodate various heights of fence netting F.

As indicated above, the frame member 20, including the support section 40, is fabricated mainly from square tubing secured together with threaded fasteners. Thus, providing square tubing of various lengths changes the distance between the wheel members 30, thereby allowing the cart assembly 10 to accommodate various height fence netting F. In addition, each rod member 60 includes a hollow, rectangular connector member 62, that encircles the upper crossbar 45 and secures each rod member 60 to the square, upper crossbar 45 of the support section 40.

In use, with the fence netting F hanging on the rod members 60 of the cart assembly 10, the end post P of the fence netting F is inserted into the ground, and the cart assembly 10 is moved away from the anchoring post P, with the fence netting F sliding off the rod members 60. Once the fence netting F is deployed, an individual can insert each post P into the ground to erect that section of fence netting F.

Figure 3:
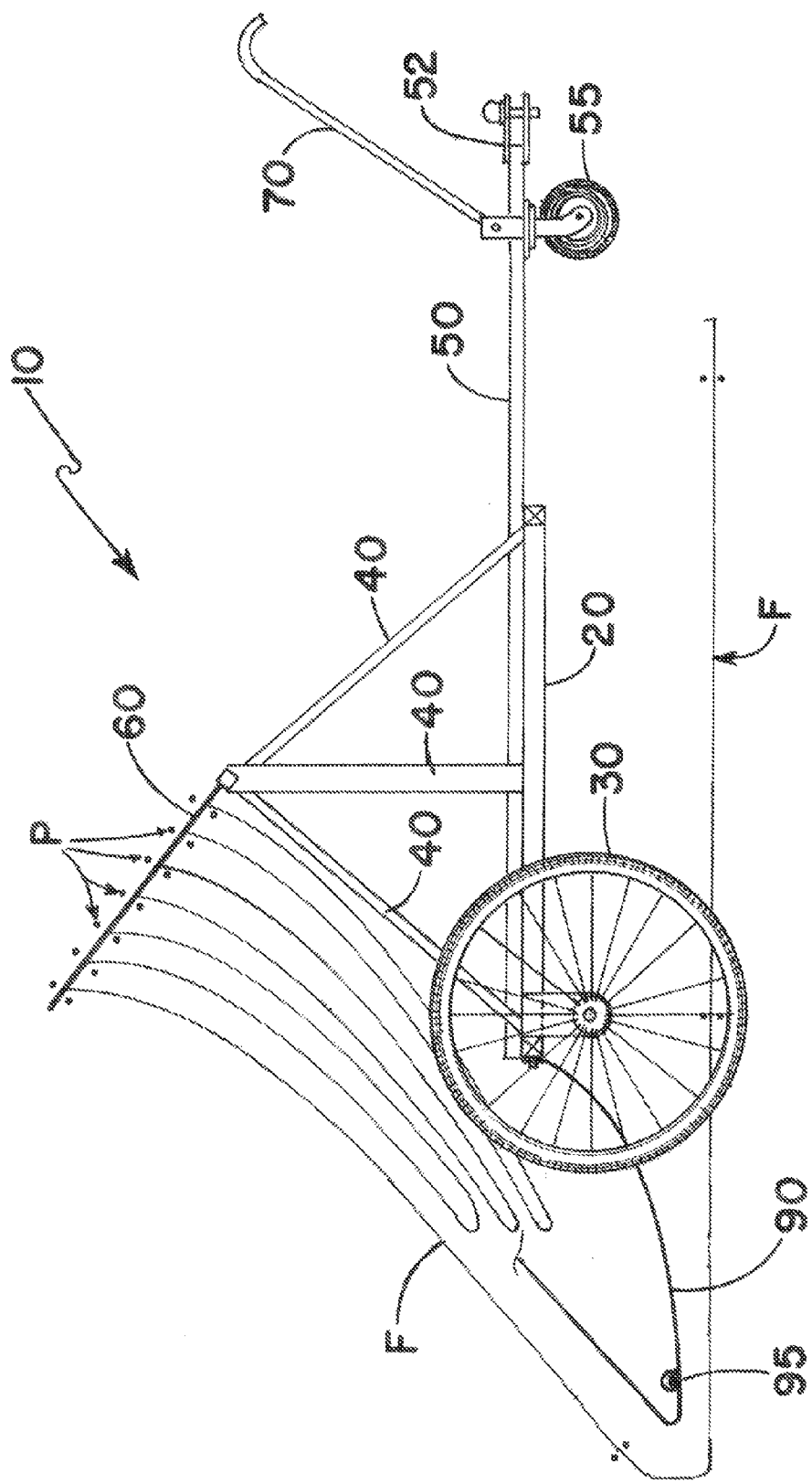
FIG. 3 is a side view of the fence netting cart assembly of the present invention, including the apron member, with a length of fence netting being gathered by the cart assembly.

To take down the fence netting F, an individual pulls each post P from the ground and lays the fence netting F flat on the ground. With the cart assembly 10 straddling the flat fence netting F, the end post P is placed over the rod members 60, followed by the adjacent post P. It is recommended that the posts P be in contact with the rod members 60 to support the folded fence netting F. The cart assembly 10 then moves forward, straddling the fence netting F, as each post P is placed atop the rod members 60. A side view of the cart assembly 10 picking up fence netting F is shown in FIG. 3. Because the frame member 20 is adjustable in width between the wheel members 30, the cart assembly 10 can accommodate fence netting F of various heights with ease.

Referring again to FIG. 3, the cart assembly 10 includes an apron member 90 secured to the frame member 20 at the end of the frame member 20 opposite the tongue section 50. The apron member 90 is fabricated from a flexible material, such as canvas, and extends the full width of the frame member 20. Once the length of fence netting F is hanging from the rod members 60, the apron member 90 is fastened to the frame member 20 by means of grommets 95 in the apron member 90. The grommets 95 are fastened to the frame member 20 by removable ties or straps (not shown). The apron member 90 protects the fence netting F while it is moved to another location.

Figure 4:
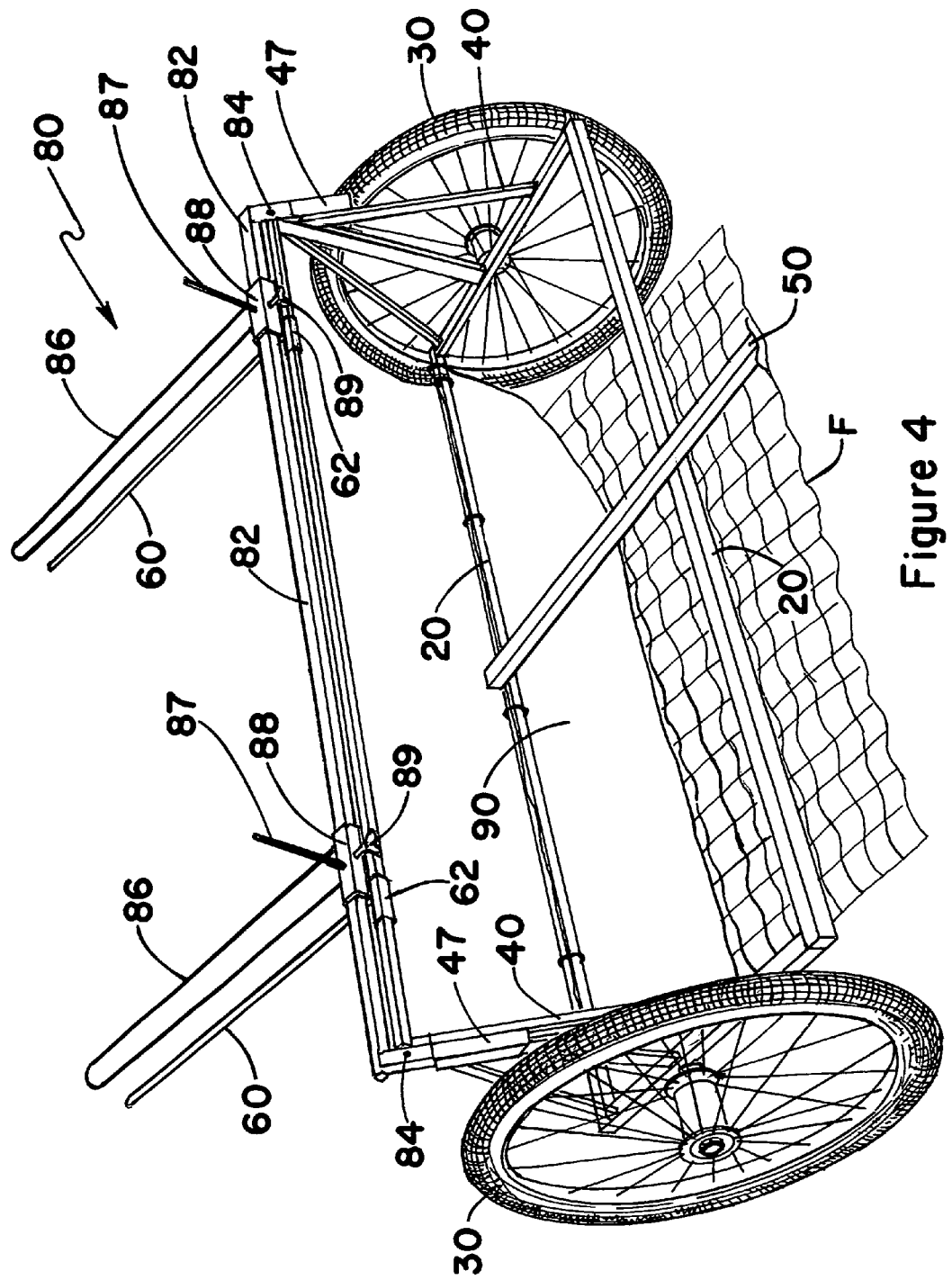
FIG. 4 is a perspective view of the fence netting cart assembly of the present invention fitted with a removable storage rack assembly.
Figure 5:
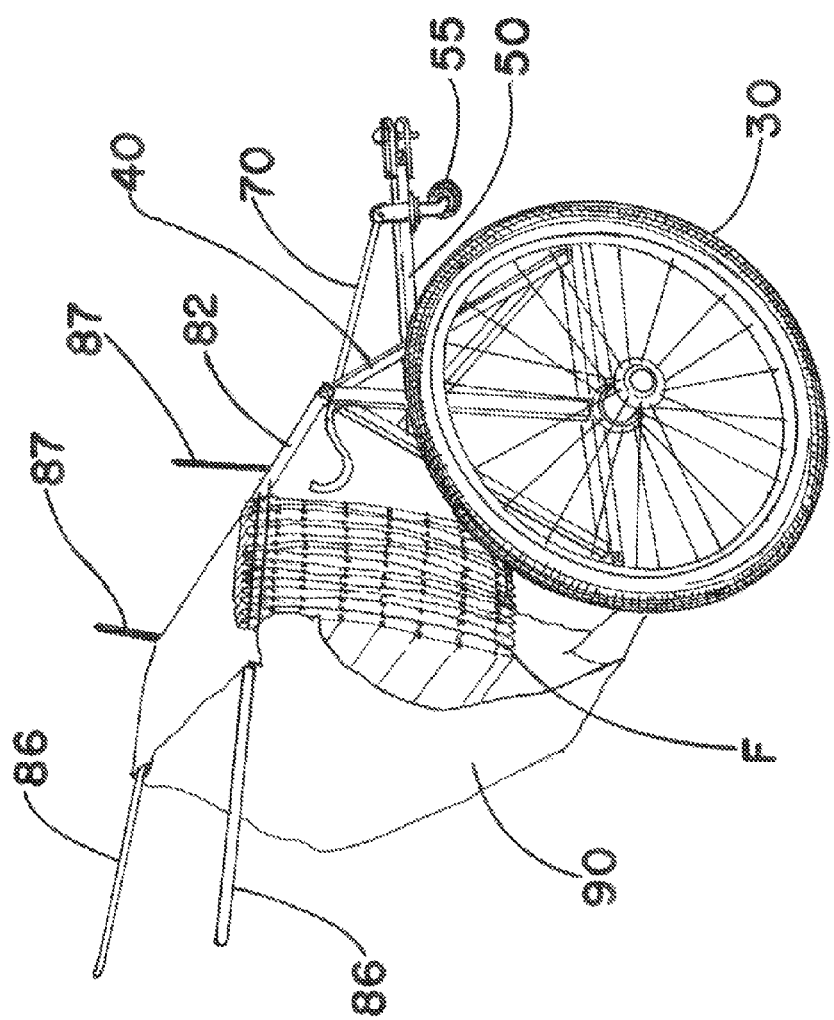
FIG. 5 is a perspective view of the fence netting cart assembly of the present invention fitted with a removable storage rack assembly containing a section of fence netting covered by the apron member.

In a further embodiment of the invention, illustrated in FIG. 4, the cart assembly 10 includes a removable storage rack assembly 80. The removable storage rack assembly 80 comprises a linear crossbar member 82 with an anchoring peg 84 at each end thereof. Each anchoring peg 84 is removably secured to a mounting bracket 47 secured to the support section 40 of the frame member 20. A pair of U-shaped storage rod members 86 are movably secured to the linear crossbar member 82, with each rod member 86 having a hollow, rectangular mounting member 88 at one end encircling the crossbar member 82. Each rod member 86 is held in position by a positioning screw 89 on the mounting member 88. The storage rack assembly 80 removably attaches to the support section 40, such that fence netting F can be supported on the U-shaped rod members 82. In addition, the apron member 90 can be wrapped around the fence netting F for transport, as shown in FIG. 5. With a length of fence netting F positioned on the storage rack member 80, the rack member 80 with the fence netting F is removed from the cart assembly 10 for storage. Each rod mounting member 88 is provided with a handle 87 to facilitate removal of the storage rack assembly 80 from the cart assembly 10, and further transport and handling of the storage rack assembly 80 with fence netting F contained thereon. This removable storage rack feature allows a single cart assembly 10 to pick up and later deploy multiple lengths of fence netting F.

While the invention has been particularly shown and described with reference to preferred embodiments thereof, it will be understood by those skilled in the art that various changes in form and details may be made therein without departing from the spirit and scope of the invention.

I claim:

1. A cart assembly for fence netting, comprising:
a planar, rectangular frame member supported on a pair of wheel members, each wheel member rotatably attached to opposite sides of the frame member;
the planar, rectangular frame member including a support section positioned there upon between the wheel members, the support section having a triangular cross section with an upper apex;
a tongue section extending laterally from the planar frame member;
a pair of individual, spaced apart rod members movably attached to the upper apex of the support section, the upper apex of the support section fabricated from rectangular tubing and the spaced apart rod members each include a connector member at one end and an opposite free, outward end, the connector member being constructed of a section of hollow, rectangular tubing the section of hollow, rectangular tubing slidably encircling the rectangular tubing of the upper apex of the support section, whereby the spaced apart rod members are individually movable along the upper apex of the support section to adjust the space between the spaced apart rod members, and whereby the support section with spaced apart rod members is adapted for removably supporting folded fence netting placed over the free, outward end of the spaced apart rod members; and a flexible apron member secured horizontally to the support section, the flexible apron member adapted for elevating the folded fence netting above the ground during transport.

2. The cart assembly for fence netting of claim 1, further including a support wheel and an attachment hitch at an end of the tongue section opposite the frame member.

3. The cart assembly for fence netting of claim 1, further including a pull handle member on the tongue section opposite the planar frame member.

4. The cart assembly for fence netting of claim 1, further including a removable storage rack assembly removably secured atop the support section, the removable storage rack assembly comprising a linear crossbar member with a substantially vertically disposed anchoring peg at each end thereof, each anchoring peg being removably insertable into a mounting bracket secured substantially vertically to the support section of the frame member, and a pair of individual U-shaped storage rod members movably secured to the linear crossbar member, the U-shaped storage rod members being independently movable along the crossbar member to adjust the space between the U-shaped storage rod members;

whereby fence netting supported on the U-shaped storage rod members of the storage rack assembly is removed from the cart assembly for storage by disconnecting the anchoring pegs of the storage rack assembly from each mounting bracket, secured to the support section of the frame member.

5. A portable fence system including a cart assembly and fence netting comprising:

(a) fence netting having a height up to approximately 5 feet and a length up to approximately 165 feet; and (b) a cart assembly comprising a planar, rectangular frame member supported on a pair of wheel members, each wheel member rotatably attached to opposite sides of the frame member;

the planar, rectangular frame member including a support section positioned there upon between the wheel members, the support section having a triangular cross section with an upper apex;

a tongue section extending laterally from the planar frame member, the tongue section including a support wheel and art attachment hitch at an end of the tongue section opposite the planar, frame member;

a pair of individual, spaced apart rod members movably attached to the upper apex of the support section, the upper apex of the support section fabricated from rectangular tubing and the spaced apart rod members each include a connector member at one end and an opposite free, outward end, the connector member being constructed of a section of hollow, rectangular tubing the hollow, rectangular tubing slidably encircling the rectangular tubing of the upper apex of the support section; whereby the spaced apart rod members are individually movable along the upper apex of the support section to adjust the space between the spaced apart rod members, and whereby the support section with spaced apart rod members is adapted for removably supporting the fence netting placed over the free, outward end of the spaced apart rod members; and a flexible, canvas apron member secured horizontally to the support section, the flexible apron member adapted for elevating the fence netting above the ground during transport.

6. The cart assembly for fence netting of claim 5, further including a pull handle member on the tongue section opposite the frame member.

7. The cart assembly for fence netting of claim 5, further including a removable storage rack assembly removably secured atop the support section, the removable storage rack assembly comprising a linear crossbar member with an anchoring peg at each end thereof, each anchoring peg removably secured to a mounting bracket secured to the support section of the frame member, and a pair of U-shaped storage rod members movably secured to the linear crossbar member;

whereby fence netting supported on the U-shaped storage rod members of the storage rack assembly is removed from the cart assembly for storage by disconnecting the storage rack assembly from each mounting bracket secured to the support section of the frame member.

8. A cart assembly for fence netting comprising:

a planar, rectangular frame member supported on a pair of wheel members, each wheel member rotatably attached to opposite sides of the frame member;

the planar, rectangular frame member including a support section positioned there upon between the wheel members, the support section having a triangular cross section with an upper apex opposite the frame member;

a tongue section extending laterally from the planar frame member, the tongue section including a support wheel and an attachment hitch at an end of the tongue section opposite the planar, frame member;

a pull handle member on the tongue section opposite the frame member; and a removable storage rack assembly removably secured atop the support section, the removable storage rack assembly; comprising a linear crossbar member with a substantially vertically disposed anchoring peg at each end thereof, each anchoring peg being removably insertable into a mounting bracket secured substantially vertically to the support section of the frame member, and a pair of individual U-shaped storage rod members movably secured to the linear crossbar member, U-shaped storage rod members being independently movable along the crossbar member to adjust the space between U-shaped storage rod members;

whereby fence netting supported on the U-shaped storage rod members of the storage rack assembly is removed from the cart assembly for storage by disconnecting the anchoring pegs of the storage rack assembly from each mourning bracket secured to the support section of the frame member.

9. The cart assembly for fence netting of claim 8, further including a flexible apron member secured to the support section, the flexible apron member adapted for elevating the fence netting above the ground during transport.

\* \* \* \* \*